April 16, 1963

E. E. DILLMAN ETAL
ADSORPTION PROCESS 3,085,380

Filed Oct. 23, 1959

Edward E. Dillman
Dan Ringo
Farwell C. Boston
INVENTORS

BY Hayden & Prawel

ATTORNEYS

Fig. 2

Edward E. Dillman
Dan Ringo
Farwell C. Boston
INVENTORS

BY Hayden & Pravel
ATTORNEYS

United States Patent Office 3,085,380
Patented Apr. 16, 1963

3,085,380
ADSORPTION PROCESS
Edward E. Dillman and Dan Ringo, Houston, Tex., and Farwell C. Boston, Shreveport, La., assignors to Engineers & Fabricators, Inc., Houston, Tex., a corporation
Filed Oct. 23, 1959, Ser. No. 850,504
16 Claims. (Cl. 55—62)

This invention relates to new and useful improvements in adsorption processes, and particularly to adsorption processes for removing hydrogen sulfide ($H_2S$) from a gas containing same.

This application is a continuation-in-part of U.S. patent application Serial No. 818,576 filed June 8, 1959, now abandoned.

In the gas industry, field or natural gas containing hydrogen sulfide ($H_2S$) is known as sour gas and gas from which the hydrogen sulfide is substantially removed is known as sweet gas. The field or natural gas is principally formed of gaseous hydrocarbons, as is well known. Generally some water is also present in the gas along with the hydrogen sulfide as the gas comes from the field. It is usually desirable to remove the hydrogen sulfide and the water from the gas before transmitting the gas to the users. The sweetening and dehydration processes heretofore used have employed expensive chemicals such as glycols for dehydration and amines for sweetening and therefore such processes have been relatively expensive. Other processes have employed adsorption beds but they have been generally uneconomical because of large losses of the hydrocarbon gases in purging and for other reasons which have been overcome by the present invention.

It is therefore an object of this invention to provide a new and improved process for removing hydrogen sulfide from natural gases containing same which process eliminates the necessity for the relatively expensive chemicals heretofore used in some processes and also eliminates the large losses of the hydrocarbon gases which occurred in other prior processes.

Another object of this invention is to provide a new and improved process for sweetening sour gas wherein a plurality of adsorption beds are used, and wherein a portion of the gas which is sweetened in the process is also used for regenerating one of the adsorption beds and is thereafter recycled in the system to obtain sweetened product gas therefrom.

An important object of this invention is to provide a new and improved process employing adsorption beds for treating sour gas to sweeten same wherein sweetened gas from one of the beds in the process is used as a regeneration gas for another of the beds in the process, and wherein such regeneration gas with a high concentration of hydrogen sulfide is treated to separate the hydrogen sulfide therefrom and to thereafter recycle the regeneration gas to another bed in the process.

A further object of this invention is to provide a new and improved process employing adsorption beds for sweetening and drying sour natural gases in which a sweet and dry regeneration gas is obtained from the process and is circulated and recycled without requiring a pump or other mechanical gas circulator for such purpose.

Still another object of this invention is to provide a new and improved process for treating sour hydrocarbon gases wherein high purity hydrogen sulfide is removed and at the same time hydrocarbon flare gas loss is substantially eliminated.

A particular object of this invention is to provide a new and improved process employing adsorption beds for the sweetening of sour gases wherein the adsorbent in each bed is substantially completely regenerated in each cycle of the process with a minimum requirement of fuel, adsorbent and equipment investment for the process.

Another object of this invention is to provide a new and improved process employing adsorption beds for treating gases wherein a portion of the treated gas is used in a countercurrent series flow through two of the adsorption beds which are on the regeneration and purge phases so as to obtain a preheating in the regeneration phase and substantially complete removal of the adsorbed components in the purge phase with a reduced quantity of such gas being required as compared to flowing such gas through only the regeneration phase.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Briefly, the process of this invention involves the removal of hydrogen sulfide, and in the usual case water also, from a feed gas which is principally composed of one or more hydrocarbons such as methane, ethane, propane, butanes, pentanes, hexanes, heptanes, octanes, and in some cases even longer chain hydrocarbons. As will be explained in detail hereinafter, the process employs a plurality of adsorption beds B-1, B-2, B-3 and B-4, which are used for adsorbing the hydrogen sulfide, and usually water, from the feed gas in a predetermined cycle of operations. While a plurality of the adsorption beds are connected in series for the adsorption cycle on those beds, one of the beds is on a regeneration cycle using gas which has been stripped by passing through at least one of the adsorption beds on the adsorption cycle. The gas which is thus used as a regeneration gas is subsequently treated, as will be explained, to separate the hydrogen sulfide and water from the gas so that such gas is recycled back to the adsorption beds which are on the adsorption cycle and the product gas is obtained from the adsorption beds with the recycled gas included therewith. As will be more evident hereinafter, with the process of this invention, there is substantially no loss of the hydrocarbon gas. Also, the hydrogen sulfide is obtained in a relatively pure form so that the sulphur may be obtained therefrom by subsequent processing if desired. Additionally, the process of this invention may be operated without the use of a pump or other gas circulator device for the circulation of the gas from the point of introduction through the process to the point of discharge as product gas.

Figure 1:
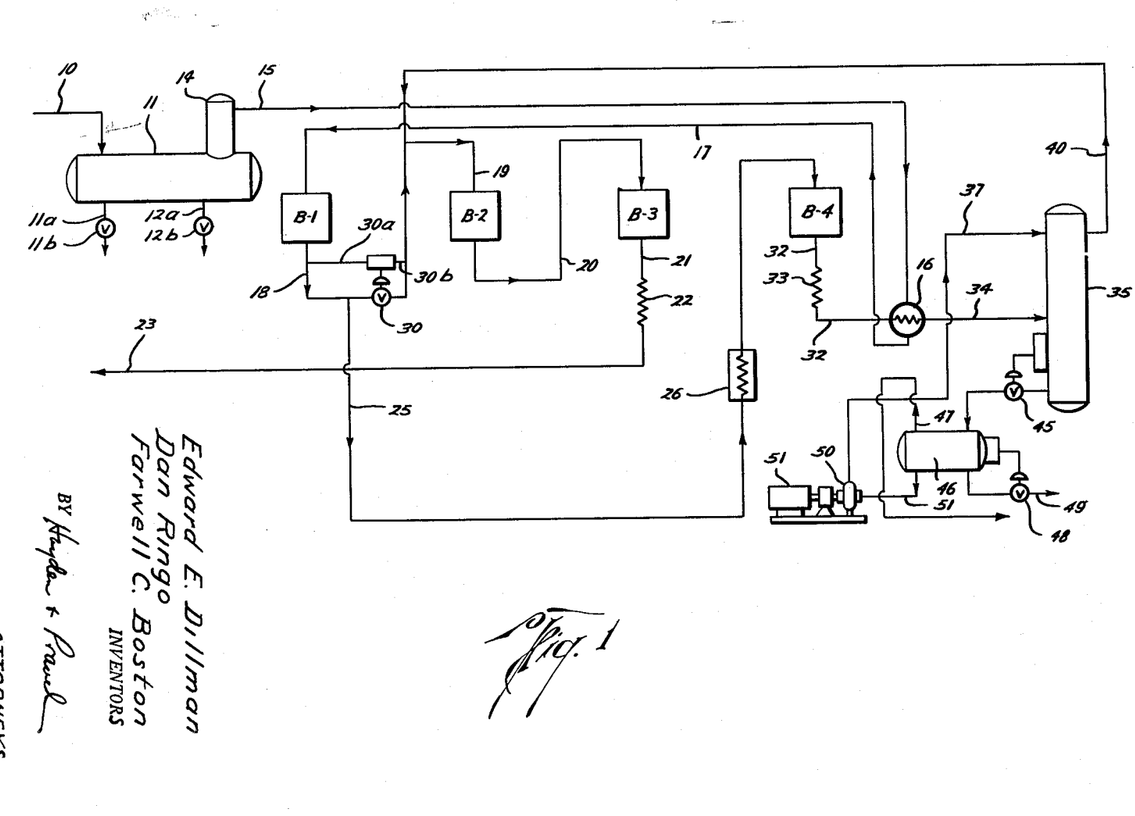
FIG. 1 is a simplified schematic view of the process of this invention.

Considering first the simplified schematic illustration of the process as shown in FIG. 1 of the drawings, the feed gas is introduced through line 10 directly from the well producing such gas or from any other source producing gas which contains hydrogen sulfide and therefore is called a sour gas. Such gas will normally also have water present therewith, although this process may be used for removing only the hydrogen sulfide if the gas has been previously dehydrated or dried. The gas, as previously pointed out, is a hydrocarbon gas in which the hydrocarbons are in a gaseous condition at the temperature and pressure of the gas as it enters and flows through the process of this invention.

The feed gas which is introduced through the line 10 flows to a separator 11 where any of the liquid water or hydrocarbons are separated from the gaseous hydrocarbons and the gaseous hydrogen sulfide and water therewith. The separated water is discharged through line 11a having a valve 11b therewith while the hydrocarbon liquids are separated through line 12a having valve 12b therewith. Such separation is accomplished in any known manner such as by cooling below the temperature at which it comes from the feed line 10. The gas then passes from the separator 11 through a conventional filter 14 which filters any foreign particles from the gas prior to its discharge through line 15. The gas flows from line 15 through a heat exchanger 16 in heat exchange relationship with the regeneration gas, as will be more fully explained hereinafter, and then the gas flows through line 17 to the first adsorption bed B–1. The bed B–1, and also the other adsorption beds, each has an adsorbent therein which is capable of preferentially adsorbing hydrogen sulfide. Also, preferably the adsorbent adsorbs the water vapor present in the gas along with the hydrogen sulfide. Preferably, the natural zeolites or any of the synthetic zeolites such as manufactured by the Linde Company could be used as the adsorbent because such zeolites are capable of adsorbing the hydrogen sulfide and the water preferentially.

As shown in FIG. 1 of the drawings, the adsorption beds B–1, B–2 and B–3 are connected in series so that after the gas leaves the adsorption bed B–1 it flows through line 18 to line 19 and then through bed B–2. The gas is then discharged from the adsorption bed B–2 through line 20 and flows in series through the bed B–3. The gas is subsequently discharged from the adsorption bed B–3 through line 21 and an atmospheric cooler or heat exchanger 22 to the product discharge line 23. Normally, the first two adsorption beds B–1 and B–2 in series will accomplish the adsorption and the bed B–3 will be principally on a cooling cycle to cool same preparatory to placing it in the second position of the cycle, as will be more evident hereinafter.

While the beds B–1, B–2 and B–3 are on the adsorption cycle, the bed B–4 is on the regeneration cycle. In order to provide a regeneration gas for the regeneration of the adsorption bed B–4, a portion of the gas from line 18 is directed through line 25, through a heater 26 to increase the temperature of the gas, and then to the adsorption bed B–4. It is to be noted that the portion of the gas which is taken from line 18 is taken upstream from a differential pressure control valve 30 of known construction which has suitable control leads 30a and 30b extending to the sides of the line 18 on each side of the valve 30. The valve 30 is controlled so that only a relatively small portion of the gas from the line 18 is directed through the line 25 and the main stream continues to flow through the valve 30 to the line 19 and the adsorption bed B–2.

Since the regeneration gas which is fed from the discharge of the first adsorption bed B–1 through line 25 to and through the adsorption bed B–4 is stripped of all, or substantially all, of of its hydrogen sulfide and water, the regeneration gas is therefore capable of absorbing the maximum quantity of the hydrogen sulfide from the adsorbent present in the adsorption bed B–4. In that way, the adsorbent in the adsorption bed B–4 is regenerated by the removal or stripping of the hydrogen sulfide from the bed B–4 with the lean or stripped gas being used for the regeneration. Of course, if any water is present in the adsorbent in the bed B–4, such water will also be removed or stripped from the bed with the regeneration gas passing therethrough. A high concentration of the hydrogen sulfide is thus obtained in the gas coming from the bed B–4 as compared to the amount of hydrogen sulfide in the feed gas introduced through line 10.

The regeneration gas is discharged from the adsorption bed B–4 through discharge line 32 and an atmospheric cooler 33 to flow through the heat exchanger 16 in heat exchange relationship with the incoming gas flowing through line 15 to line 17, as previously pointed out. Since the regeneration gas flowing through line 32 is warmer than the incoming gas through line 15, the regeneration gas in line 32 is cooled while the incoming gas in line 15 is heated in the heat exchange relationship of the heat exchanger 16.

The regeneration gas with its high concentration of hydrogen sulfide flows from the heat exchanger 16 through the line 34 to an absorber tower 35 for countercurrent flow with respect to water which is introduced through the line 37. The water absorbs hydrogen sulfide from the hydrocarbon gas and therefore the hydrocarbon gas is discharged from the absorber 35 through line 40 for recycling or return to the adsorption phase of the system. If water is present in the gas from line 32, it is condensed prior to the absorber by the exchangers 33 and 16 and is separated from the gas in the accumulator 46. The regeneration gas from line 40 is mixed with the gas flowing from the first adsorption bed B–1 to the second adsorption bed B–2 through the line 18 and the line 19. Thus, the line 40 is joined with the line 18 and the gases from both lines flow together through line 19 to the second adsorption bed B–2. Thereafter, the mixed gases flow through the adsorption bed B–2, line 20, the third adsorption bed B–3 and then they are discharged through line 21, the cooler 22 and the product line 23. The pressure of the gas in line 40 as it is mixed with the gas in line 18 is at substantially the same pressure as the gas in the line 18 and such pressure is controlled by the setting of the differential pressure control valve 30. Such control is obtained by setting the differential pressure control valve 30 so that the drop in pressure from the upstream side of the valve 30 to the downstream side thereof in line 18 is substantially equal to the pressure drop of the portion of the gas flowing from line 25 to line 40.

The hydrogen sulfide and the water are also separated from each other by any suitable procedure such as illustrated schematically in FIG. 1 wherein the water with the absorbed hydrogen sulfide is discharged through a liquid level control valve 45 to a flash tank 46. Since the gas flowing through the system will normally be at a pressure above atmospheric, the flash tank 46 is operated at atmospheric pressure so that the hydrogen sulfide is flashed or is vaporized from the water and is released or discharged from the tank 46 through the line 47 as a gas. Such hydrogen sulfide gas may then be burned in an open flare or it may be passed to a sulphur recovery plant for further processing. It is to be pointed out that the concentration of the hydrogen sulfide in the gas which is discharged through line 47 is high as compared with the hydrogen sulfide in the incoming gas and it contains a very small amount of hydrocarbon gas therewith so that there is substantially no hydrocarbon gas loss with the flaring or other disposal of the hydrogen sulfide gas from the flash tank 46. The water is separated in the known manner with a liquid level control valve 48 discharging the water through line 49 when the level of the water in the tank 46 reaches a predetermined point. However, a majority of the water is recirculated with a pump 50 connected to line 51 leading from the flash tank 46. The pump 50 pumps the water through line 37 to the absorber tower 35. The pump 50 may be driven by any suitable power source, but preferably a gas driven engine 51 would be used.

It is to be noted that in carrying out the process or system of this invention, no pump is required for the circulation of the gas through the system. Such elimination of the pump is possible when the feed gas introduced through line 10 is at the normal pressures obtained from the field which usually exceed 250 pounds per square inch. However, so long as the pressure of the feed gas is sufficient to recycle the regeneration gas at a pressure above atmospheric and discharge the product or sweet gas through the line 23 at atmospheric or slightly above atmospheric, the system will be operative without a pump. Normally, when a pump is not employed, the system therefore requires a pressure of at least about 50 pounds per square inch, although it is to be understood that the invention is not to be limited to any particular pressure. If a pump is not used, the pressure must be sufficient to accomplish the driving force for the recycling of the regeneration gas and the obtaining of the product gas as explained. When the feed gas is at the pressure above atmospheric pressure for the feeding of the gas through the system without a pump, the flask tank is at atmospheric pressure for the flashing of the hydrogen sulfide from the water which occurs spontaneously because of the drop in pressure in the tank. However, if the system is operated with a pump to force the gas through the system, the flask tank may be operated at a pressure below atmospheric pressure for the flashing of the hydrogen sulfide from the water.

Figure 2:
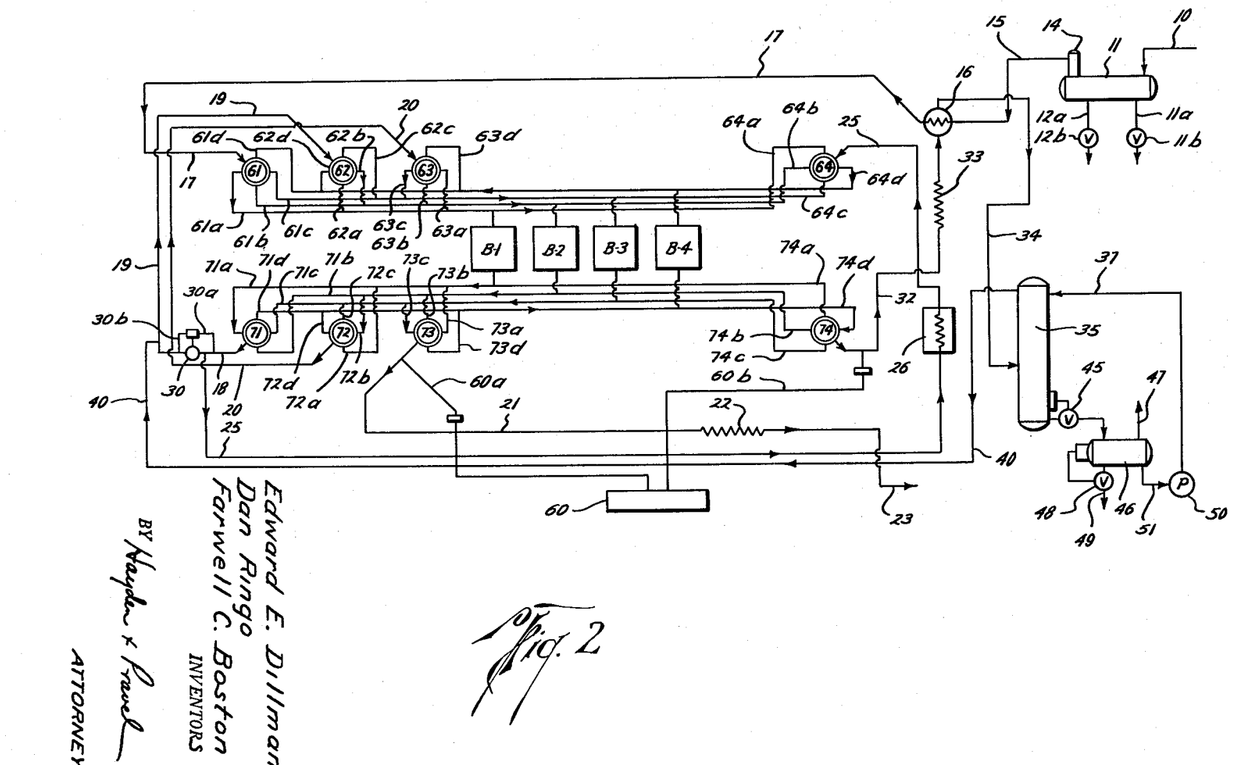
FIG. 2 is a more detailed schematic view of the process of this invention.

Referring now to FIG. 2 of the drawings wherein a more detailed flow sheet of the process is shown, the parts which are the same in FIGS. 1 and 2 have the same numerals and letters. Basically, the process of FIG. 2 is identical with the process of FIG. 1, except that multiport rotary valves are included in the system of FIG. 2 for changing the phase with respect to each of the adsorption beds periodically in accordance with the cycle control designated at 60 in FIG. 2. Such cycle controls may be any standard controls for regulating the switching of the valves to the beds B–1, B–2, B–3 and B–4 in accordance with the temperatures of the gases flowing from the lines to which the cycle controls 60 are connected.

In FIG. 2, the multi-port rotary valves 61, 62, 63 and 64 are the inlet multi-port rotary valves and the valves 71, 72, 73 and 74 are the outlet multi-port rotary valves. Such valves are preferably of the construction disclosed in United States patent application Serial No. 669,753 filed July 3, 1957.

The valve 61 has its inlet connected to line 17 and its outlet connected with lines 61a, 61b, 61c and 61d. Only one of such outlets is open at a time and in the illustration of FIG. 2 of the drawings, the outlet line 61a is the only outlet open so that the gas from line 17 passes through the valve 61 and out through the opening for the line 61a to flow through the adsorption bed B–1. As will be more evident hereinafter, as the valve 61 is rotated, the openings 61a, 61b, 61c and 61d are consecutively opened for flow to the adsorption beds B–1, B–2, B–3 and B–4, respectively.

The inlet valve 62 has its inlet connected to the line 19 and it has its outlet connected to outlet lines 62a, 62b, 62c and 62d, which are in turn connected with the flow lines 61a, 61b, 61c and 61d, respectively. In the particular cycle illustrated in FIG. 2, the valve 62 is open to the outlet line 62b and therefore to the line 61b for flow to the second adsorption bed B–2.

The multi-port rotary valve 63 has its inlet connected to the line 20 and it has outlet lines 63a, 63b, 63c and 63d which are connected with lines 61a, 61b, 61c and 61d, respectively. In the particular cycle illustrated in FIG. 2, the outlet line 63c is the only outlet line from the valve 63 which is open so that there is flow through the valve 63 from the line 20 to the line 63c and then to the line 61c and finally to the adsorption bed B–3, as will be more fully explained.

The multi-port rotary valve 64 has its inlet connected to the flow line 25 for receiving the regeneration gas and such valve 64 has outlet lines 64a, 64b, 64c and 64d which are connected with lines 61a, 61b, 61c and 61d, respectively. In the particular cycle illustrated in FIG. 2, the line 64d is the only outlet from the valve 64 which is open so that the flow occurs through the line 64d to the line 61d and then to the bed B–4 which is on the regeneration cycle.

The valve 71 has its outlet connected to the discharge line 18 and it has inlet lines 71a, 71b, 71c and 71d which are connected to the discharge side of the adsorption beds B–1, B–2, B–3 and B–4, respectively. In the particular cycle illustrated in FIG. 2, the line 71a to the valve 71 is open for flow through the valve 71 to the line 18 from the adsorption bed B–1.

The valve 72 has its outlet connected to line 20 and it has inlet lines 72a, 72b, 72c and 72d connected therewith and also to the lines 71a, 71b, 71c and 71d, respectively. In the particular cycle illustrated in FIG. 2, the line 72b is open to the valve 72 and therefore the discharge from the adsorption bed B–2 flows through the line 72b and the valve 72 to the line 20.

The valve 73 has its outlet connected to the line 21 and it has its inlet connected to the lines 73a, 73b, 73c and 73d, which are connected to the lines 71a, 71b, 71c and 71d, respectively. In the particular cycle illustrated in FIG. 2, the inlet line 73c to the valve 73 is open so that the discharge from the adsorption bed B–3 flows through the valve 73 to the line 21.

The valve 74 has its outlet connected to the line 32 and it has inlet lines 74a, 74b, 74c and 74d connected thereto and to the lines 71a, 71b, 71c and 71d, respectively. In the particular cycle illustrated in FIG. 2, the line 74d is open to the valve 74 so that the discharge from the bed B–4 which is on the regeneration cycle is directed through the valve 74 to the line 32.

The process disclosed in connection with the flow sheet of FIG. 1 of the drawings is identical with the process which is disclosed in connection with FIG. 2 when the valves are positioned as illustrated in FIG. 2 of the drawings. In other words, the beds B–1, B–2 and B–3 are connected in series for adsorption, with the principal adsorption of the hydrogen sulfide and water occurring in the first two adsorption beds B–1 and B–2 and with the bed B–3 being cooled preparatory to being moved to the second position. Such cooling is desirable because the bed B–3 has previously been on the regeneration cycle, as will be more evident hereinafter and when on such regeneration cycle is warmed or heated by the warmed regeneration gas. The bed B–4 is on the regeneration cycle and the regeneration gas is flowing therethrough. The cycle controls indicated at 60 are connected with suitable temperature control lines 60a and 60b to the flow lines 21 and 32, respectively, so that the temperature controls are actuated to rotate the valves 61–64 and 71–74 to the next phase or cycle when the temperature condition in the lines 21 and 32 have reached the desired or predetermined conditions. The temperature of the gas being discharged through the line 21 is indicative of the extent of the adsorption in the beds B–1, B–2 and B–3 which are on the adsorption phase or cycle and the temperature of the gas in the line 32 is indicative of the extent of regeneration of the gas in the bed B–4 which is on the regeneration cycle, so that when both of the phases, namely the adsorption and the regeneration have reached their desired temperatures and optimum operating conditions, then the cycle controls 60 operate to shift the multi-port rotary valves to change the beds to the next position.

Such shifting of the valves will place the bed B–2 in communication with the line 17 and therefore it will be the first adsorption bed which will be connected in series with the adsorption beds B–3 and B–4. Therefore, the bed B–4 will actually be the third bed in series and will be cooled by the gas flowing therethrough. Since such bed was previously on the regeneration cycle, the cooling is desirable prior to its being placed in the second and then the first adsorption positions. The bed B–1 is shifted to the regeneration cycle so that the regeneration gas from line 25 flows through the valve 64 to the bed B–1.

Subsequent shifting of the multi-port rotary valves places the bed B-3 as the first adsorption bed, the bed B-4 as the second adsorption bed in series and the bed B-1 as the third adsorption bed in series. In that instance, the bed B-2 is on the regeneration cycle.

The next shift in the multi-port rotary valves places the adsorption bed B-4 in the first adsorption position, the bed B-1 in the second adsorption position and the bed B-2 in the third adsorption position. At that time, the bed B-3 is on the regeneration phase or cycle. When the multi-port rotary valves are again shifted, they will be returned to the positions indicated in FIG. 2 so that the beds will then be on the positions previously described wherein the beds B-1, B-2 and B-3 are on the adsorption cycle or phase and the bed B-4 is on the regeneration cycle or phase. Therefore, it can be seen that the process of FIG. 1 is identical with the process of FIG. 2 except that the process of FIG. 1 is a continuous process with the beds being shifted with suitable controls. The shifting of the beds may be accomplished with any suitable equipment, including time control devices.

Figure 3:
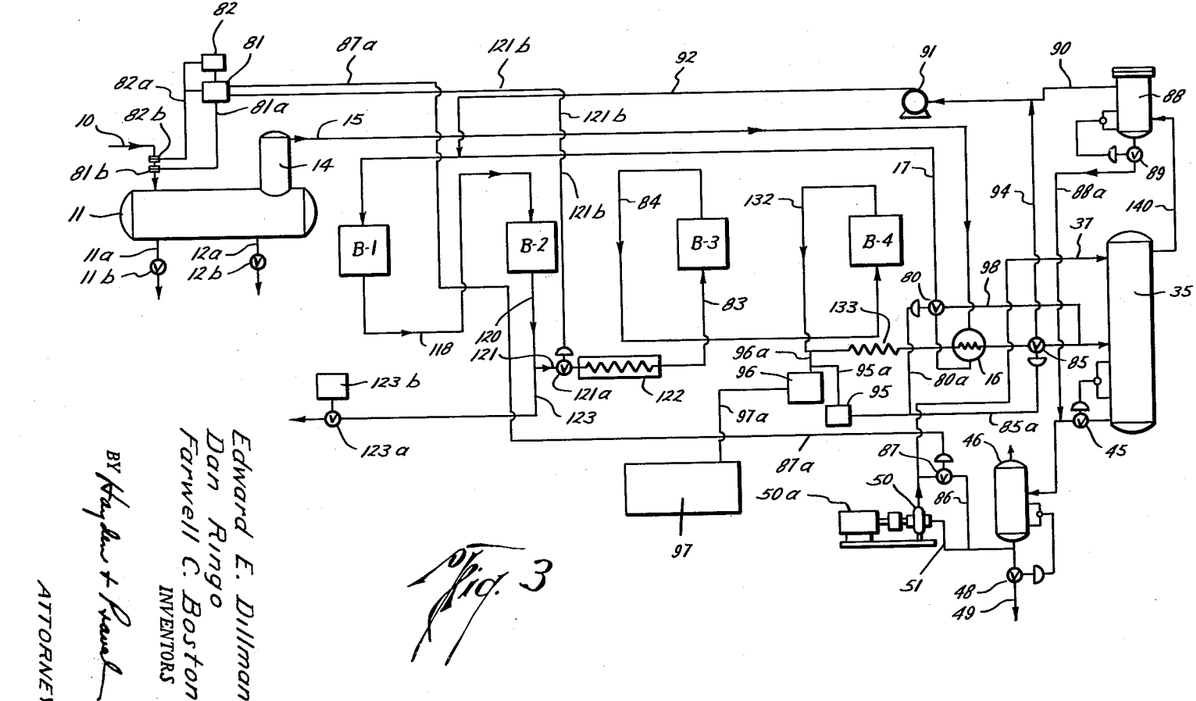
FIG. 3 is a schematic view of a modified form of the process of this invention.

In FIG. 3 of the drawings, a modified form of the invention is illustrated, wherein those parts which are identical with parts shown in the flow diagram of FIG. 1 bear like numerals or letters. Generally speaking, the method illustrated in FIG. 3 differs from the methods illustrated in FIG. 1 and 2 in that in the FIG. 3 method, the sweetened gas from the second adsorption bed in series is passed through two other adsorption beds which are on the purge and regeneration phases. As will be more fully explained, with the modified form of the process of this invention as illustrated in FIG. 3, a preheating of the adsorption bed on the regeneration phase is accomplished so that substantially complete removal of the adsorbed components in the purge phase is accomplished with a reduced quantity of the sweetened gas.

Considering the form of the invention shown in FIG. 3 more in detail, the incoming feed gas is introduced through the feed line 10 and it flows to the separator 11 which is used in the same manner as heretofore explained in connection with FIG. 1. Also, as previously explained in connection with FIG. 1 the separated water is discharged through line 11a having valve 11b therewith while the hydrocarbon liquids are separated through the line 12a having the valve 12b therewith. The separated gas passes from the separator 11 through the filter 14 to the discharge line 15. The gas flows from line 15 through the heat exchanger 16 to line 17 which has a three-way valve 80 therein. The line 17 is connected with the adsorption bed B-1. The bed B-1 as well as the other beds B-2, B-3 and B-4 have an adsorbent therein which is capable of preferentially adsorbing hydrogen sulfide, and also preferably the adsorbent adsorbs the water vapor present in the gas along with the hydrogen sulfide. Any of the adsorbents previously identified in connection with the method illustrated in FIGS. 1 and 2 of the drawings may be used in FIG. 3. The gas leaving the bed B-1 flows through line 118 to the adsorption bed B-2 which bed B-2 is thus in series with the bed B-1. The sweetened gas flowing from the bed B-2 is discharged through line 120 which connects with lines 121 and 123. The line 123 flows to the product line or to storage through a suitable valve 123a which preferably has a known type of flow meter 123b connected therewith. The sweetened gas which flows from line 120 into line 121 flows through a control valve 121a which regulates the flow of such gas to the adsorption beds B-3 and B-4. The flow through the valve 121a may be controlled manually or by any suitable known equipment or apparatus, and as schematically illustrated in FIG. 3, the valve 121a is connected with a conventional flow ratio controller 81 through a line 121b. The flow ratio controller 81 is connected with the inlet line 10 through line 81a and a standard orifice connection 81b so that as the inlet flow of gas varies, the amount of regeneration gas flowing through the valve 121a will vary. Another conventional regulator 82 is connected to the line 10 with a standard orifice connection 82b and line 82a and such regulator works in conjunction with the controller 81 through line 87a to control the amount of by-pass around the pump 50 through the valve 87.

The gas flowing through the valve 121a is directed through a heater 122 which heats the sweetened gas prior to its flow to the bed B-3. The temperature of the gas flowing from the heater 122 may be varied, depending upon the particular conditions of operation and the particular adsorbents used, but in the preferred form of the invention the gas will be heated to approximately 550° F. prior to passing through the bed B-3. The heated gas passes from the heater 122 to the bed B-3 through flow line 83 and is discharged therefrom through line 84. It is to be noted that the direction of the flow of the heated gas through the bed B-3 is countercurrent or opposite from the direction of the gas flowing through the beds B-1 and B-2 which are on the adsorption phase of the cycle. The gas flows from the line 84 to the bed B-4 and is discharged therefrom through line 132. Again, it should be noted that the flow of the gas through the bed B-4 is countercurrent or opposite from the flow of the gas through the beds B-1 and B-2 which are on the adsorption phase of the cycle. It should also be evident from FIG. 3 that the beds B-3 and B-4 are in series with each other, with the bed B-3 being on the purge phase and with the bed B-4 being on the regeneration phase. An atmospheric cooler 133 is connected in the line 132 for partially cooling the hot gases discharged from the bed B-4 and also there is a further cooling in heat exchanger 16 as the gas flows through a three-way valve 85 to the absorber tower 35 for countercurrent flow in the usual manner with respect to water which is introduced through the line 37. The feed of the water through line 37 to the absorber tower 35 is accomplished with the same equipment and procedure as explained previously in connection with FIG. 1 and the same parts have the same numerals. An additional bypass line 86 is preferably provided in the form of the invention shown in FIG. 3 with a valve 87 connected in such line 86, which, as previously mentioned, is connected to the controller 81 so that the amount of water circulated to the tower 35 through the line 37 is regulated in accordance with the amount of the feed gas entering the system.

The hydrocarbon gas from which the hydrogen sulfide and water have been removed is discharged through line 140 to a vapor or mist extractor 88 which removes any entrained mist or water vapor in the hydrocarbon gas and returns same through line 88a, the flow of which is controlled by means of a valve 89 or any other suitable means. The hydrocarbon gas is thus substantially dry as it is discharged from the extractor 88 through line 90 and such gas is pumped by means of a gas circulator or compressor 91 which recycles the gas through line 92 to line 17 which returns the gas to the adsorption bed B-1.

The valve 85 is connected with a flow line 94 which flows into the line 90 and therefore, as will be more fully explained, when the valve 85 is positioned so that the flow of the gas from the heat exchanger 16 is directed through the line 94 rather than to the absorber tower 35, the gas in line 94 is recirculated or cycled back through the adsorption bed B-1 with the pump or compressor 91. The three-way valve 85 and the three-way valve 80 may be controlled manually or by any suitable automatic means, but as illustrated in the drawings, a pair of temperature controllers 95 and 96 are mounted in conjunction with cycle controls schematically shown at 97 for controlling such operation. The temperature controller 95 is connected with the three-way valve 85 through line 85a and with three-way valve 80 through line 80a so that when the temperature in the line 132 reaches a predetermined point, the valves 80 and 85 are shifted to direct the flow of gas through the valve 85 to line 94 and through the valve 80 to line 98. The temperature controller 96 is connected with the line 132 through line 96a and to the cycle controls 97 through line 97a for the purpose of shifting the multi-port rotary valves, as explained hereinafter in connection with FIG. 4 so as to shift the flow of gases to the beds.

In carrying out the method or process of this invention as illustrated in the form thereof shown in FIG. 3 of the drawings, the incoming feed gas is caused to flow in series through the beds B–1 and B–2, and a portion of the gas discharged from the adsorption bed B–2 through line 120 is discharged as a sweetened gas through line 123. A portion of such sweetened gas from the bed B–2 is passed through line 21 and heater 122 to the bed B–3 which is on the purge phase. Since the bed B–3 was previously on the regeneration phase when it was in the position of the bed B–4, the bed B–3 has been previously heated and therefore the initial gas flowing through the line 83 and then through the bed B–3 is able to remove substantially all of the adsorbed hydrogen sulfide and water in the bed B–3 with the gas and with a relatively small quantity of the sweetened gas. This is because the bed B–3 has been preheated by the previous regeneration phase. Thus, the hot gas with the entrained or adsorbed components of the hydrogen sulfide and the water in the extremely concentrated form are then passed to the bed B–4 and the heat of the gas heats up the bed B–4 until it has come up to the desired temperature, which is preferably in the order of about 550° F. Very little, if any, of the adsorbed components in the bed B–4 are removed with the gas in the regeneration phase indicated by the bed B–4 in FIG. 3, but instead the bed B–4 is actually being preheated for the subsequent purging when it reaches the position of the bed B–3 on the purge phase. The gas with the concentration of the hydrogen sulfide therein then flows through the line 132 from the bed B–4 and to the absorber tower 35 for the extraction and separation of the hydrogen sulfide, as previously explained. The valve 85 would be open during such period for the flow to the absorber 35 from the line 132 and would be closed for flow from the line 132 to the line 94. However, since the amount of the regeneration gas which flows through the line 83 to the bed B–3 and ultimately to the bed B–4 is relatively small as compared to the amount of regeneration gas which would be required if only a single regeneration step were utilized, the time for such regeneration cycle is shortened and therefore when the bed B–3 has been fully purged, the gas which then flows through the bed B–4 has practically no hydrogen sulfide or water therewith for the latter part of the stage and that gas is preferably returned or recycled back to the bed B–1. To accomplish such recycling of the lean hydrocarbon gas which is coming off of the bed B–4 through the line 132 during the latter part of the regeneration phase, the three-way valve 85 is manipulated so as to close the flow of the gas from the line 132 to the absorber tower 35 and to open same to the line 94. At the same time the valve 85 is so manipulated, the valve 80 is manipulated so that instead of the gas flowing in the line 15 flowing through the line 17, such gas is caused to flow through line 98 from the valve 80 to the absorber tower 35. This gives the incoming feed gas an initial pass through the absorber tower 35 and removes some of the hydrogen sulfide and water therewith prior to the flow through the bed B–1. After the complete adsorption has taken place in the bed B–1 and B–2 then the beds are all shifted to the next phases, as will be more fully explained and the valves 85 and 80 are switched back to the positions in which they are originally located, namely, with the valve 85 directing flow from the line 132 to the absorber tower 35 and with the valve 80 directing flow from the heat exchanger 16 to the line 17.

Figure 4:
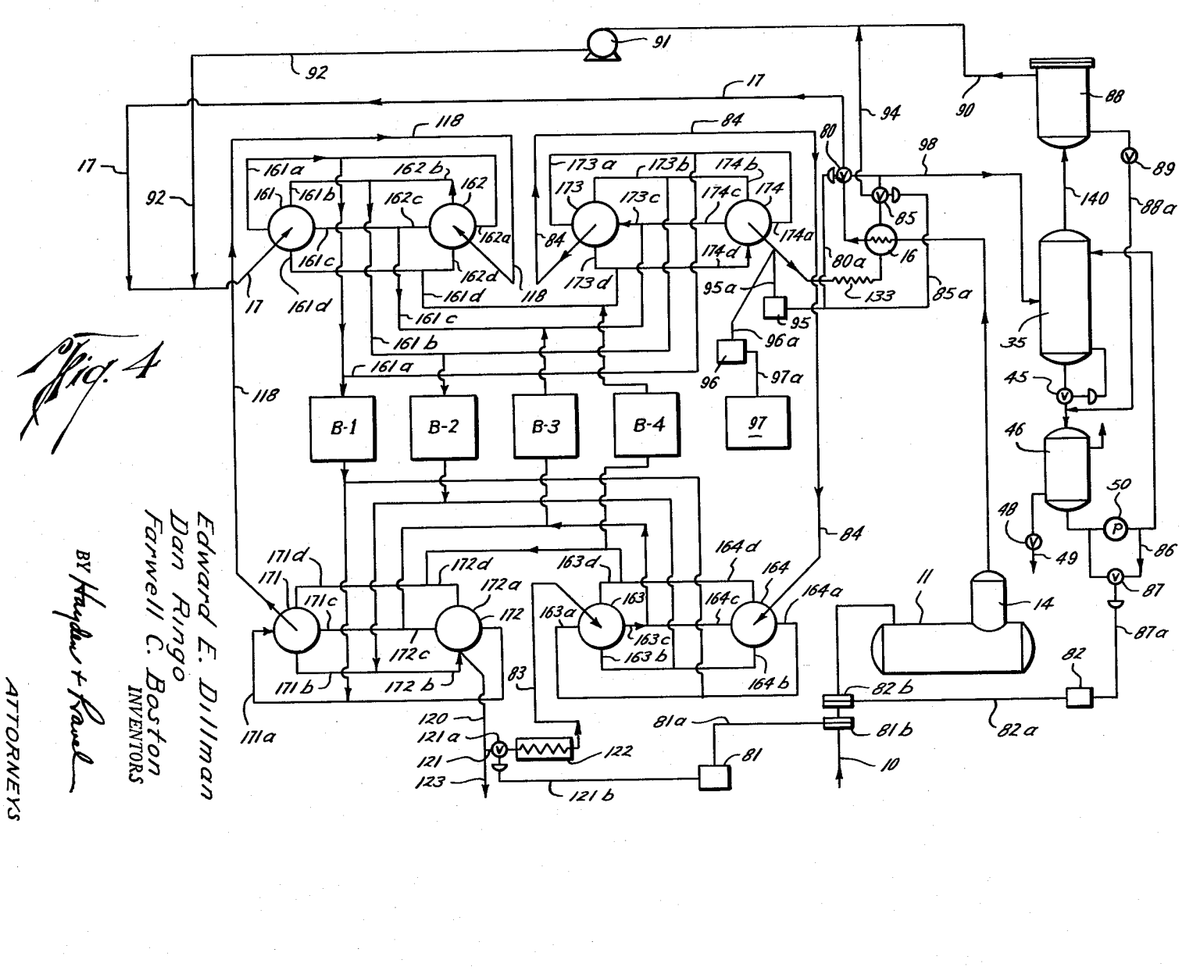
FIG. 4 is a more detailed schematic view of the modified process of FIG. 3.

In FIG. 4 of the drawings, a more detailed flow sheet of the modified process described above in connection with FIG. 3 is shown, and the parts of which are the same in FIGS. 3 and 4 have the same numerals and letters. Basically, the process of FIG. 4 is identical with the process of FIG. 3, except that the multi-port rotary valves are included in the illustration of FIG. 4 for changing the cycle or phase with respect to each of the adsorption beds periodically in accordance with the cycle control designated with the numeral 97 in FIGS. 3 and 4. Such cycle controls, as previously explained, may be any standard controls for regulating the switching of the valves to the beds B–1, B–2, B–3 and B–4 of FIGS. 3 and 4 in accordance with the temperature and flow conditions of the gases flowing from the line or lines to which the cycle controls 97 are connected.

In FIG. 4, the multi-port rotary valves 161, 162, 163 and 164 are the inlet multi-port rotary valves and the multi-port rotary valves 171, 172, 173 and 174 are the outlet multi-port rotary valves. Such valves are preferably of the construction disclosed in United States patent application Serial No. 669,753 filed July 3, 1957.

The valve 161 has its inlet connected to the line 17 and its outlet connected with lines 161a, 161b, 161c and 161d. Only one of such outlet lines is open at a time and in the illustration of FIG. 4 of the drawings, the outlet line 161a is the only outlet which is open so that the gas from the line 17 passes through the valve 161 and out through the opening for the line 161a to flow through the adsorption bed B–1. As will be more evident hereinafter, as the valve 161 is rotated, the lines 161a, 161b, 161c and 161d are consecutively opened for flow to the adsorption beds B–1, B–2, B–3 and B–4, respectively.

The inlet valve 162 has its inlet connected to the line 118 and it has its outlet connected to outlet lines 162a, 162b, 162c and 162d, which are in turn connected with the flow lines 161a, 161b, 161c and 161d, respectively. In the particular cycle illustrated in FIG. 4, the valve 162 is open to the outlet line 162b and therefore to the line 161b for flow to the second adsorption bed B–2.

The multi-port rotary valve 163 has its inlet connected to the line 83 and it has outlet lines 163a, 163b, 163c and 163d which are connected with lines 151a, 151b, 151c and 151d which are in turn connected with the adsorption beds B–1, B–2, B–3 and B–4, respectively. In the particular cycle illustrated in FIG. 4, the outlet line 163c is the only outlet line from the valve 163 which is open so that there is flow through the valve 163 from the line 83 to the line 151c and finally to the adsorption bed B–3, as will be more fully explained.

The multi-port rotary valve 164 has its inlet connected to the flow line 84 and it has outlet lines 164a, 164b, 164c and 164d which are connected with the flow lines 151a, 151b, 151c and 151d, respectively. In the particular cycle illustrated in FIG. 4, the line 164d is the only outlet from the valve 164 which is open so that the flow occurs through the valve 164 to the line 164d and the line 151d and then to the bed B–4.

The outlet valve 171 has its outlet connected to the flow line 118 and it has inlet lines 171a, 171b, 171c and 171d which are connected with the flow lines 151a, 151b, 151c and 151d, respectively. In the particular cycle illustrated in FIG. 4, the line 171a is open while the other lines 171b, 171c and 171d are closed so that the fluid flows from the bed B–1 through line 171a and then through the valve 171 to the line 118.

The valve 172 has its outlet connected to line 120 and it has inlet lines 172a, 172b, 172c and 172d connected therewith, which lines are connected to the flow lines 151a, 151b, 151c and 151d, respectively. In the particular cycle illustrated in FIG. 4, the line 172b is open while the lines 172a, 172c and 172d are closed and therefore the flow from the bed B–2 flows through the line 172b and the valve 172 for discharge through the outlet line 120.

The outlet valve 173 has its outlet connected to the flow line 84 and it has its inlet connected to the lines 173a, 173b, 173c, and 173d, which are connected to the lines 161a, 161b, 161c and 161d, respectively. In the particular cycle illustrated in FIG. 4, the inlet line 173c to the valve 173 is the only inlet line to the valve 73 which is open so that the discharge from the adsorption bed B-3 which is on the purge phase flows through the valve 173 to the line 84.

The valve 174 has its outlet connected to the line 132 and it has inlet lines 174a, 174b, 174c and 174d which are connected with the lines 161a, 161b, 161c and 161d, respectively. In the particular cycle illustrated in FIG. 4, the inlet line 174d is the only inlet line to the valve 174 which is open so that the discharge from the bed B-4 which is on the regeneration phase is directed through the valve 174 to the line 132.

The method disclosed in connection with the flow sheet of FIG. 4 of the drawings is identical with the method which is disclosed in connection with FIG. 3 of the drawings when the valves are positioned as illustrated in FIG. 4 of the drawings, and as previously explained. Thus, the beds B-1 and B-2 are connected in series for adsorption of the feed gas, and the beds B-3 and B-4 are connected for series countercurrent flow as explained previously in connection with FIG. 3. As previously pointed out in connection with FIG. 3, any suitable cycle controls of conventional construction as indicated at 97 in FIGS. 3 and 4 may be used for shifting the multi-port rotary valves 161, 162, 163, 164, 171, 172, 173 and 174 when it is desired to change the cycle or phase through the various adsorption beds B-1, B-2, B-3 and B-4. Such shifting of the multi-port rotary valves occurs, by way of example, when the temperature in the line 132 reaches a predetermined point which is detected by a temperature controller of conventional construction indicated at 96 which is connected with the cycle controls 97. However, in the preferred manner of operation of the form of the invention disclosed in FIGS. 3 and 4, the temperature controller 95 which is also connected to the line 132 will normally shift the three-way valves 80 and 85 prior to the shifting of the multi-port rotary valves 161-164 and 171-174. Such shifting of the three-way valves 80 and 85 is for the purpose of returning the relatively lean regeneration or sweetened gas from the line 132 which is being discharged from the bed B-4 during the latter portion of the cycle or phase so that such lean sweetened gas returns through the line 94 back to the adsorption bed B-1. The shifting of the three-way valve 80 causes the inlet or feed gas in line 15 to pass through the absorber tower 35, as explained in connection with FIG. 3 so as to remove a portion of the hydrogen sulfide and water from the feed gas prior to its flow through the adsorption phase.

When the cycle controls 97 are actuated to shift the multi-port rotary valves 161-164 and 171-174, the three-way valves 80 and 85 are returned to their original positions wherein the gas from the line 132 is directed to the absorber tower 35 and the incoming or feed gas is directed from line 15 to line 17 for flow to the first bed on the adsorption phase.

When the multi-port rotary valves are shifted from the positions shown in FIG. 4, they are actually rotated and each moves to the next position which in effect accomplishes a shift in the flow of the gas to the beds in a consecutive order. Thus, the first shift of the multi-port rotary valves from the position shown in FIG. 4 will place the bed B-2 in the position of the first bed in the series on adsorption and the bed B-3 is the second bed in series on the adsorption phase. Such result occurs because the valve 161 is shifted to position the opening or line 161b in the open position while the other outlet openings or lines 161a, 161c and 161d from the valve 161 are closed and therefore the feed gas from the line 17 flows through the valve 161 and the line 161b to the bed B-2. Similarly, the outlet valve 171 shifts so that the line 171b thereto is open while the other inlet lines or openings to the valve 171 are closed so that the flow from the bed B-2 is then directed through line 171b and through the valve 171 to line 118. Since the valve 162 has also shifted so as to place the line 162c in the open position with the lines 162a, 162b and 162d in the closed position, the flow of the gas through line 118 passes through the valve 162 and line 162c to the bed B-3. The discharge from the bed B-3 flows through line 151c to the line 172c of the valve 172 and since the valve 172 has also been shifted, the line 172c is the only inlet opening to the valve 172 which is open and therefore such gas passes through the valve 172 and is discharged through the line 120. A portion of the gas in line 120 is discharged as product through the product line 123 and the other portion of the sweetened gas passes through the heater 122 and the line 83 to the multi-port rotary valve 163. The valve 163 has also been shifted so that the line 163d therewith is the only outlet opening or line from the valve 163 which is open and therefore the gas flows therethrough to the line 151d and then to the bed B-4 which is thus on the purge phase. Since the bed B-4 was previously on the regeneration phase, such bed has been previously preheated to the temperature of approximately 550° F. by way of example, at which the optimum purging or regeneration occurs. Therefore, the removal of the adsorbed hydrogen sulfide in the bed B-4 occurs with a relatively small amount of the gas flowing through the bed B-4 and such gas with the removed hydrogen sulfide from the bed B-4 flows to the line 161d and then to the open line 173d of the valve 173. The regeneration gas flows from the valve 173 through line 84 to the valve 164 which has been shifted to open the line 164a to cause the gas to flow in the line 164a to the line 151a and then to flow countercurrently through the bed B-1. Such countercurrent flow through the bed B-1 is on the regeneration phase and accomplishes the heating of the bed B-1 for the subsequent purging operation. The regeneration gases then flow from the bed B-1 through the line 161a to the inlet opening 174a on the valve 174 for discharge through the line 132. The regeneration gas from the line 132 is then treated as previously explained.

After the cycle has been completed with the beds in such shifted position, the valves 161-164 and the valves 171-174 are again shifted to next place the beds B-3 and B-4 in series for the absorption and to place the bed B-1 on the purge phase and the bed B-2 on the regeneration phase. The next shift in the multi-port rotary valves places the beds B-4 and B-1 in series on the adsorption phase and places the beds B-2 and B-3 on the purge and regeneration phases, respectively. The final shift in the multi-port rotary valve returns the beds to the position shown in FIG. 4, and of course, the valves may be rotated through as many cycles as desired.

From the foregoing description, it will be appreciated that each bed which is on the regeneration phase or cycle is shifted so that it is placed on the purge phase or cycle in the next cycle of operations. Because of that fact, the bed which is on the purge phase has been preheated during the regeneration phase and such preheating enables the removal of the adsorbed components from the bed on the purge phase with a minimum amount of the sweetened gas which is being used for the regeneration. In fact, the amount of gas is approximately half of that required for the regeneration of a single bed on a regeneration phase or cycle. Also, as previously explained because of the fact that the amount of gas for the regeneration and purging is reduced in quantity, an additional preliminary recovery of the hydrogen sulfide is obtained by the circulation of a part of the incoming or feed gas through the absorber tower 35 before it passes to the first adsorption phase.

From the foregoing description, the advantages and objects of this invention are believed evident.

The foregoing disclosure and description of the invention is illustrative and explanatory thereof and various changes in the size, shape and materials, as well as in the details of the illustrated construction, may be made with-

What is claimed is:

1. A process for removing hydrogen sulfide from hydrocarbon gas, comprising the steps of, directing a hydrocarbon feed gas having hydrogen sulfide therewith through a plurality of adsorption beds in series wherein the beds have an adsorbent therein capable of adsorbing the hydrogen sulfide from the gas preferentially, withdrawing a portion of the gas after it has passed through one of said adsorption beds and directing same to another adsorption bed which had previously adsorbed hydrogen sulfide, such portion of the gas serving as a regeneration gas after it is heated for regenerating such bed by stripping the hydrogen sulfide therefrom so that such gas leaves such bed with a high concentration of hydrogen sulfide therewith as compared to the amount of hydrogen sulfide in the feed gas, thereafter absorbing the hydrogen sulfide from such regeneration gas, and thereafter returning the regeneration gas from which hydrogen sulfide has been separated to the plurality of adsorption beds to obtain sweetened product gas therefrom.

2. A process for removing hydrogen sulfide from hydrocarbon gas, comprising the steps of, directing a hydrocarbon feed gas having hydrogen sulfide therewith through a plurality of adsorption beds in series wherein the beds have an adsorbent therein capable of adsorbing the hydrogen sulfide from the gas preferentially, withdrawing a portion of the gas after it has passed through one of said adsorption beds and directing same to another adsorption bed which had previously adsorbed hydrogen sulfide, such portion of the gas serving as a regeneration gas after it is heated for regenerating such bed by stripping the hydrogen sulfide therefrom so that such gas leaves such bed with a high concentration of hydrogen sulfide therewith as compared to the amount of hydrogen sulfide in the feed gas, thereafter absorbing the hydrogen sulfide from the regeneration gas with water, and thereafter returning the regeneration gas from which hydrogen sulfide has been separated to the plurality of adsorption beds to obtain sweetened product gas therefrom.

3. A process for removing hydrogen sulfide from hydrocarbon gas, comprising the steps of, directing a hydrocarbon feed gas having hydrogen sulfide therewith through a plurality of adsorption beds in series wherein the beds have an adsorbent therein capable of adsorbing the hydrogen sulfide from the gas preferentially, withdrawing a portion of the gas after it has passed through one of said adsorption beds and directing same to another adsorption bed which had previously adsorbed hydrogen sulfide, such portion of the gas serving as a regeneration gas after it is heated for regenerating such bed by stripping the hydrogen sulfide therefrom so that such gas leaves such bed with a high concentration of hydrogen sulfide therewith as compared to the amount of hydrogen sulfide in the feed gas, thereafter absorbing the hydrogen sulfide from such regeneration gas, and thereafter returning the regeneration gas from which hydrogen sulfide has been separated to the second of the plurality of adsorption beds to mix with the main gas stream flowing from said one of said adsorption beds to said second bed for flow therethrough to obtain sweetened product gas.

4. A process for removing hydrogen sulfide from hydrocarbon gas, comprising the steps of, directing a hydrocarbon feed gas having hydrogen sulfide therewith through at least three adsorption beds in series wherein the beds have an adsorbent therein capable of adsorbing the hydrogen sulfide from the gas preferentially, withdrawing a portion of the gas after it has passed through one of said adsorption beds and directing same to another adsorption bed which had previously adsorbed hydrogen sulfide, such portion of the gas serving as a regeneration gas after it is heated for regenerating such bed by stripping the hydrogen sulfide therefrom so that such gas leaves such bed with a high concentration of hydrogen sulfide therewith as compared to the amount of hydrogen sulfide in the feed gas, thereafter absorbing the hydrogen sulfide from such regeneration gas, and thereafter returning the regeneration gas from which hydrogen sulfide has been separated to the plurality of adsorption beds to obtain sweetened product gas therefrom.

5. A process for removing hydrogen sulfide from hydrocarbon gas, comprising the steps of, feeding a hydrocarbon gas under pressure through a plurality of adsorption beds in series having an adsorbent therein capable of adsorbing hydrogen sulfide, withdrawing a portion of the gas after it has passed through one of said adsorption beds and while still under pressure directing same to another adsorption bed which had previously adsorbed hydrogen sulfide, such portion of the gas serving as a regeneration gas after it is heated for regenerating such bed by stripping the hydrogen sulfide therefrom, absorbing the hydrogen sulfide from the regeneration gas, and thereafter returning the regeneration gas from which hydrogen sulfide has been separated to the second of the plurality of adsorption beds at substantially the same pressure as the main stream of gas flowing from the first to the second of the plurality of beds, whereby a pump for circulating the regeneration gas is obviated.

6. A process for removing hydrogen sulfide and water from hydrocarbon gas, comprising the steps of, directing a hydrocarbon feed gas having hydrogen sulfide and water therewith through a plurality of adsorption beds in series wherein the beds have an adsorbent therein capable of preferentially adsorbing the hydrogen sulfide and water from the gas, withdrawing a portion of the gas after it has passed through one of said adsorption beds and directing same to another adsorption bed which had previously adsorbed hydrogen sulfide and water, such portion of the gas serving as a regeneration gas after it is heated for regenerating such bed by absorbing the hydrogen sulfide and water therefrom so that such gas leaves such bed with a high concentration of hydrogen sulfide and water therewith as compared to the amount of hydrogen sulfide and water in the feed gas, thereafter absorbing the hydrogen sulfide and water from such regeneration gas, and thereafter returning the regeneration gas from which hydrogen sulfide has been separated to the plurality of adsorption beds to obtain sweetened product gas therefrom.

7. A process for removing hydrogen sulfide and water from hydrocarbon gas, comprising the steps of, feeding a hydrocarbon gas under pressure through a plurality of adsorption beds in series having an adsorbent therein capable of adsorbing hydrogen sulfide and water, withdrawing a portion of the gas after it has passed through one of said adsorption beds and while still under pressure directing same to another adsorption bed which had previously adsorbed hydrogen sulfide and water, such portion of the gas serving as a regeneration gas after it is heated for regenerating such bed by stripping the hydrogen sulfide and water therefrom, absorbing the hydrogen sulfide and water from the regeneration gas, and thereafter returning the regeneration gas from which hydrogen sulfide has been separated to the second of the plurality of adsorption beds at substantially the same pressure as the main stream of gas flowing from the first to the second of the plurality of beds, whereby a pump for circulating the regeneration gas is obviated.

8. A process for removing hydrogen sulfide and water from hydrocarbon gas, comprising the steps of, feeding a hydrocarbon gas under pressure through a plurality of adsorption beds in series having an adsorbent therein capable of adsorbing hydrogen sulfide and water, withdrawing a portion of the gas after it has passed through one of said adsorption beds and while still under pressure directing same to another adsorption bed which had previously adsorbed hydrogen sulfide and water, such portion of the gas serving as a regeneration gas after it is heated for regenerating such bed by stripping the hydrogen sulfide and water therefrom, absorbing the hydrogen sulfide and water from the regeneration gas, thereafter reducing the pressure on the separated hydrogen sulfide and water to vaporize the hydrogen sulfide and discharge same as a gas from the water in liquid form, and returning the regeneration gas to the adsorption beds after the separation of the hydrogen sulfide and water therefrom.

9. A process for removing hydrogen sulfide from hydrocarbon gas, comprising the steps of, directing a hydrocarbon feed gas having hydrogen sulfide therewith through a plurality of adsorption beds in series wherein the beds have an adsorbent therein capable of adsorbing the hydrogen sulfide from the gas preferentially, withdrawing a portion of the gas after it has passed through one of said adsorption beds and after it is heated directing same countercurrently once through a plurality of adsorption beds which are connected in series and which had previously adsorbed hydrogen sulfide, such portion of the gas serving as the entire regeneration gas for removing substantially all of the adsorbed hydrogen sulfide from at least one of the beds through which such regeneration gas flows, thereafter absorbing the hydrogen sulfide from the regeneration gas, and thereafter returning the regeneration gas to one of said adsorption beds.

10. A process for removing hydrogen sulfide from hydrocarbon gas, comprising the steps of, directing a hydrocarbon feed gas having hydrogen sulfide therewith through a plurality of adsorption beds in series wherein the beds have an adsorbent therein capable of adsorbing the hydrogen sulfide from the gas preferentially, withdrawing a portion of the gas after it has passed through one of said adsorption beds and after it is heated directing same countercurrently once through a plurality of adsorption beds which are connected in series and which had previously adsorbed hydrogen sulfide, such portion of the gas serving as the entire regeneration gas for removing substantially all of the adsorbed hydrogen sulfide from the first one of the beds through which such regeneration gas flows, thereafter absorbing the hydrogen sulfide from the regeneration gas, and thereafter returning the regeneration gas to one of said adsorption beds.

11. A process for removing hydrogen sulfide from hydrocarbon gas, comprising the steps of, directing a hydrocarbon feed gas having hydrogen sulfide therewith through a plurality of adsorption beds in series wherein the beds have an adsorbent therein capable of adsorbing the hydrogen sulfide from the gas preferentially, withdrawing a portion of the gas after it has passed through one of said adsorption beds and heating and directing same once through to a plurality of adsorption beds which are connected in series and which had previously adsorbed hydrogen sulfide, such portion of the gas serving as the entire regeneration gas for removing substantially all of the adsorbed hydrogen sulfide from at least one of the beds through which such regeneration gas flows, thereafter absorbing the hydrogen sulfide from the regeneration gas, and thereafter returning the regeneration gas to one of said adsorption beds.

12. A process for removing hydrogen sulfide from hydrocarbon gas, comprising the steps of, directing a hydrocarbon feed gas having hydrogen sulfide therewith through a plurality of adsorption beds in series wherein the beds have an adsorbent therein capable of adsorbing the hydrogen sulfide from the gas preferentially, withdrawing a portion of the gas after it has passed through one of said adsorption beds and heating and directing same countercurrently to a plurality of adsorption beds which are connected in series and which had previously adsorbed hydrogen sulfide, such portion of the gas serving as a regeneration gas for removing substantially all of the adsorbed hydrogen sulfide from at least one of the beds through which such regeneration gas flows, thereafter absorbing the hydrogen sulfide from the regeneration gas, and thereafter returning the regeneration gas to one of said adsorption beds.

13. A process for removing hydrogen sulfide from hydrocarbon gas, comprising the steps of, directing a hydrocarbon feed gas, having hydrogen sulfide therewith through a plurality of adsorption beds having an adsorbent therein capable of adsorbing the hydrogen sulfide from the gas preferentially, withdrawing a portion of the gas after it has passed through at least one said plurality of adsorption beds and directing same to another adsorption bed which had previously adsorbed hydrogen sulfide, such portion of the gas serving as a regeneration gas after it is heated for regenerating said another bed by desorbing the hydrogen sulfide therefrom so that such regeneration gas leaves said another adsorption bed with a high concentration of hydrogen sulfide therewith as compared to the amount of hydrogen sulfide in the feed gas, thereafter absorbing hydrogen sulfide from such regeneration gas, and thereafter returning the regeneration gas to one of said first adsorption beds.

14. A process for removing acid gas from hydrocarbon gas, comprising the steps of, directing a hydrocarbon feed gas having acid gas therewith through a plurality of adsorption beds having an adsorbent therein capable of adsorbing the acid gas from the hydrocarbon gas, withdrawing a portion of the gas after it has passed through at least one of said plurality of adsorption beds and directing same to another adsorption bed which had previously adsorbed the acid gas, such portion of the withdrawn gas serving as a regeneration gas after it is heated for regenerating said another bed by desorbing the acid gas therefrom so that the gas leaving said another adsorption bed has a higher concentration of the acid gas therewith than the feed gas, thereafter absorbing acid gas from such regeneration gas, and thereafter returning the regeneration gas to one of said first adsorption beds.

15. A process for removing hydrogen sulfide from hydrocarbon gas, comprising the steps of, directing a hydrocarbon feed gas having hydrogen sulfide therewith through a first adsorption bed having an adsorbent therein capable of adsorbing the hydrogen sulfide from the gas preferentially, withdrawing a portion of the gas after it has passed through said first adsorption bed and directing same to a second adsorption bed which had previously adsorbed hydrogen sulfide, such portion of the gas serving as a regeneration gas after it is heated for regenerating such bed by desorbing the hydrogen sulfide therefrom so that such regeneration gas leaves said second adsorption bed with a high concentration of hydrogen sulfide therewith as compared to the amount of hydrogen sulfide in the feed gas, thereafter absorbing hydrogen sulfide from such regeneration gas, and thereafter returning the regeneration gas from which hydrogen sulfide has been separated to said first adsorption bed to obtain sweetened product gas therefrom.

16. A process for removing acid gas from hydrocarbon gas, comprising the steps of, directing a hydrocarbon feed gas having acid gas therewith through a first adsorption bed having an adsorbent therein capable of adsorbing the acid gas from the gas preferentially, withdrawing a portion of the gas after it has passed through said first adsorption bed and after it is heated directing same to a second adsorption bed which had previously adsorbed acid gas, such portion of the gas serving as a regeneration gas for regenerating such bed by desorbing the acid gas therefrom so that such regeneration gas leaves said second adsorption bed with a high concentration of acid gas therewith as compared to the amount of acid gas in the feed gas, thereafter absorbing acid gas from such regeneration gas, and thereafter returning the regeneration gas from which acid gas has been separated to said first adsorption bed to obtain sweetened product gas therefrom.

(References on following page)

References Cited in the file of this patent

UNITED STATES PATENTS

| | | |
|---|---|---|
| 2,665,769 | Walker et al. | Jan. 12, 1954 |
| 2,747,681 | Schuftan et al. | May 29, 1956 |
| 2,799,361 | Miller | July 16, 1957 |
| 2,823,764 | Miller | Feb. 18, 1958 |
| 2,861,651 | Miller | Nov. 25, 1958 |
| 2,995,208 | Hachmuth et al. | Aug. 8, 1961 |

FOREIGN PATENTS

| | | |
|---|---|---|
| 286,622 | Great Britain | June 5, 1929 |